United States Patent
Summer

(10) Patent No.: US 12,434,567 B2
(45) Date of Patent: Oct. 7, 2025

(54) SYSTEMS AND METHODS FOR MOTOR TORQUE CONTROL FOR UNIVERSAL JOINT CORRECTION

(71) Applicant: Dana Automotive Systems Group, LLC, Maumee, OH (US)

(72) Inventor: Mark Summer, Perrysburg, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 124 days.

(21) Appl. No.: 18/405,488

(22) Filed: Jan. 5, 2024

(65) Prior Publication Data

US 2024/0246423 A1 Jul. 25, 2024

Related U.S. Application Data

(60) Provisional application No. 63/480,650, filed on Jan. 19, 2023.

(51) Int. Cl.
*B60L 15/20* (2006.01)
*B60K 1/00* (2006.01)
*B60K 17/16* (2006.01)

(52) U.S. Cl.
CPC ............... *B60L 15/20* (2013.01); *B60K 1/00* (2013.01); *B60K 17/16* (2013.01); *B60L 2240/421* (2013.01); *B60L 2240/423* (2013.01); *B60L 2240/461* (2013.01); *B60L 2240/486* (2013.01)

(58) Field of Classification Search
CPC ............... B60L 15/20; B60L 2240/421; B60L 2240/423; B60L 2240/461; B60L 2240/486; B60L 15/2054; B60L 15/32; B60K 1/00; B60K 17/16; B60K 17/354; B60K 17/356; B60K 2001/001
See application file for complete search history.

(56) References Cited

U.S. PATENT DOCUMENTS 11,272,929 B2    3/2022   Williams et al.
2018/0339698 A1* 11/2018  Höck ................... B60W 10/08

* cited by examiner

Primary Examiner — Alan D Hutchinson
(74) Attorney, Agent, or Firm — McCoy Russell LLP

(57) ABSTRACT

Methods and systems are provided for operating a vehicle system, including determining a motion of a universal joint in a drive axle assembly of the vehicle system and adjusting a speed of a motor of the vehicle system based on the motion of the universal joint.

18 Claims, 9 Drawing Sheets

SYSTEMS AND METHODS FOR MOTOR TORQUE CONTROL FOR UNIVERSAL JOINT CORRECTION

CROSS REFERENCE TO RELATED APPLICATIONS

The present application claims priority to U.S. Provisional Application No. 63/480,650, titled "SYSTEMS AND METHODS FOR MOTOR TORQUE CONTROL FOR UNIVERSAL JOINT CORRECTION," and filed Jan. 19, 2023, the entire contents of which is hereby incorporated by reference for all purposes.

TECHNICAL FIELD

The present description relates generally to an electrical vehicle, and more particularly to controlling electric motor torque to compensate for bent universal joints in an electric vehicle axle.

BACKGROUND AND SUMMARY

Universal joints (e.g., Cardan joints) allow rotatory motion to be transmitted from an input shaft to an output shaft, where the axes of the shafts are (or can be) inclined relative to each other. Universal joints are often used on front axle shafts of trucks and larger vehicles to permit the steering wheels to change direction. However, the universal joint suffers from a shortcoming in that when bent (e.g., when the shaft axes are inclined), the input speed and output speed of the universal joint do not match. The mismatched rotational speed of the input and output shafts of the universal joint may cause the front axle to accelerate relative to the rest of the drivetrain. As such, a vibration or shuddering motion may be felt when the steering angle of the vehicle is high.

Other attempts to address the mismatch of the input and output shaft speeds include disconnecting the front wheels from the driveline when all-wheel drive is not needed, or utilizing constant velocity joints instead of universal joints. However, the inventors herein have recognized potential issues with such systems. For example, constant velocity joints may add complexity and expense to the vehicle. Universal joints are less expensive and more robust than constant velocity joints, leading to increased manufacturing costs and degradation of the joints when constant velocity joints are used. Additionally, the use of a hub lock, transfer case, or other disconnect device may add unnecessary complexity to the vehicle.

In one example, the issues described above may be addressed by a method for operating a vehicle system comprising determining a motion of a universal joint in a drive axle assembly of the vehicle system, and adjusting a speed of a motor of the vehicle system based on the motion of the universal joint.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
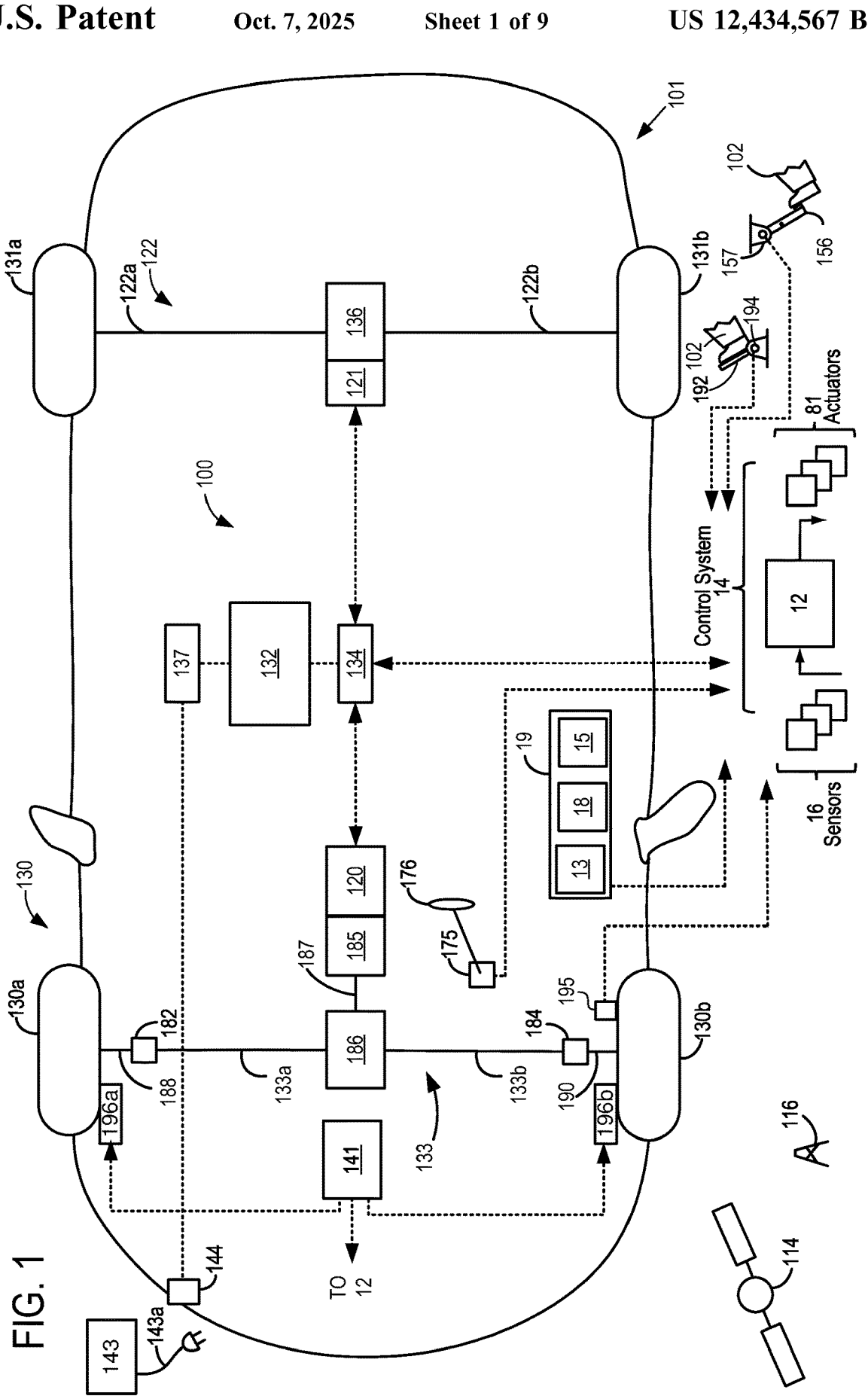
FIG. 1 is a schematic diagram of an example vehicle driveline.
Figure 2:
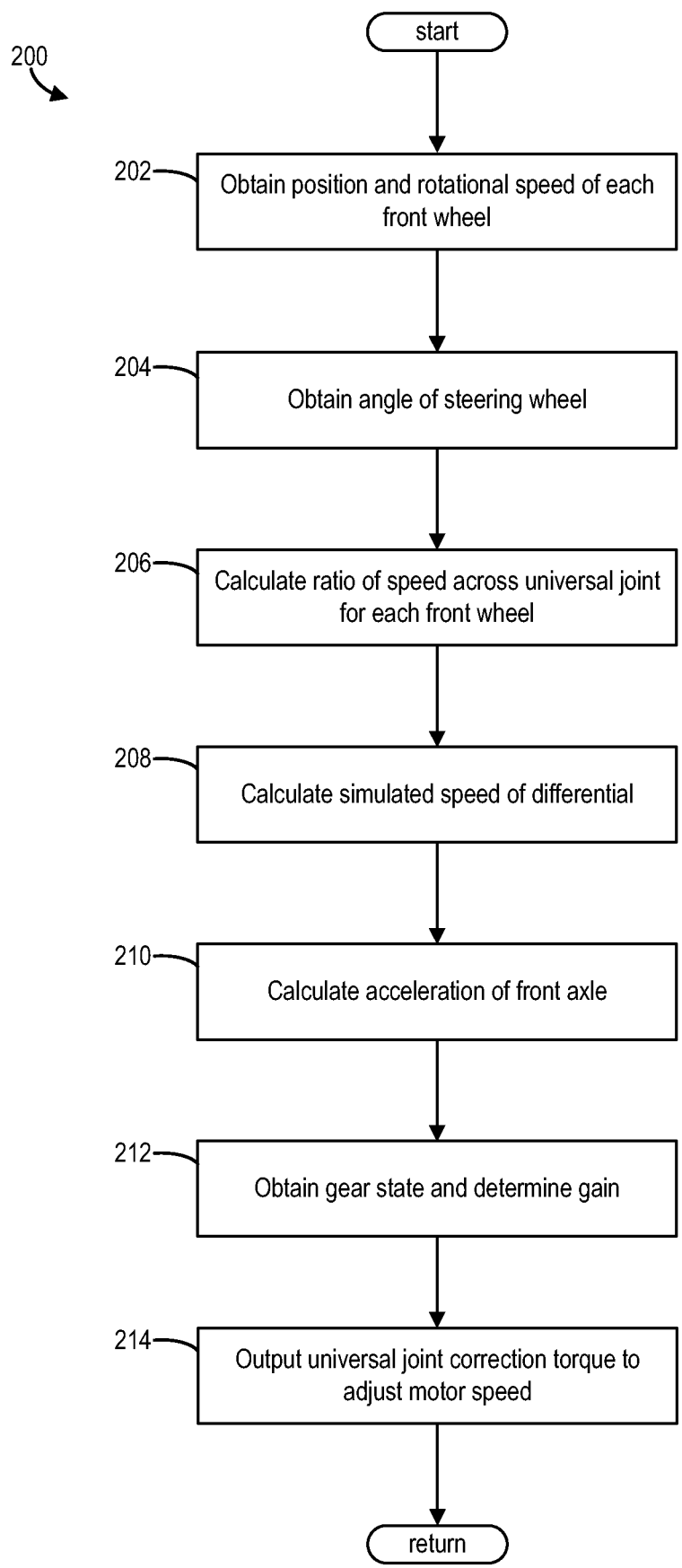
FIG. 2 is a flowchart illustrating a method for adjusting a speed of a motor of a vehicle based on a speed differential across one or more universal joints, in accordance with one or more embodiments of the present disclosure.

The following description relates to systems and methods for controlling motor torque to compensate for bent universal joints in an electric vehicle axle. FIG. 1 shows a vehicle including an electric machine and a drive axle assembly, where the electric machine may drive the drive axle assembly. The drive axle assembly may include a front axle and front wheels. The front axle may include two universal joints (e.g., Cardan joints), each of which permits rotary motion from the front axle to be transferred to a respective front wheel even while the front wheels change direction as the vehicle steers. When steering, the input shaft of each universal joint may rotate at a different speed than the corresponding output shaft of the universal joint, resulting in vibration and shuddering motions. The vibration/shuddering motions may be due to a mismatch between the speed of the front axle (which may accelerate due to the bent universal joint) and the speed of the electric motor and the rest of the drivetrain. The mismatch of speed between the front axle and the motor may be decreased through the use of the method illustrated in FIG. 2. Additionally, the method described in FIG. 2 may be implemented according to a selected control process, such as the control processes illustrated in FIGS. 3A-3C, FIGS. 4A and 4B, and FIG. 5. An example sequence of events that may occur during execution of the method of FIG. 2 is shown in a timing diagram illustrated in FIG. 6.

FIG. 1 illustrates an example electric vehicle propulsion system 100 for vehicle 101. The electric vehicle propulsion system 100 includes a front axle 133 and a rear axle 122. In some examples, rear axle 122 may comprise two half shafts, for example first half shaft 122a and second half shaft 122b. Similarly, the front axle 133 may comprise two half shafts, for example first half shaft 133a and second half shaft 133b. The electric vehicle propulsion system 100 further includes a first front wheel 130a, a second front wheel 130b, a first rear wheel 131a, and a second rear wheel 131b.

In this example, the first front wheel 130a and the second front wheel 130b and/or the first rear wheel 131a and the second rear wheel 131b may be driven via electrical propulsion sources. As shown, front axle 133 may be driven by a first electric machine 120 (also referred to as a traction motor) and rear axle 122 may be driven by a second electric machine 121. However, in other examples, first electric machine 120 may be the sole propulsion torque source for vehicle 101 or second electric machine 121 may be the sole propulsion torque source for vehicle 101. In examples where second electric machine 121 is the sole propulsion torque source for vehicle 101, four-wheel drive capability may be provided via selective coupling between second electric machine 121 (and/or a transmission coupled to second electric machine 121, which is not shown) and differential 186, which may be mediated by a transfer case, for example. In still further examples, vehicle 101 may include one or more additional torque sources, such as an internal combustion engine. First electric machine 120 is shown coupled to differential 186 via transmission 185 and a drive shaft 187, and differential 186 is part of front axle 133. As such, the first electric machine 120 may drive the front axle 133 via the drive shaft 187. Similarly, second electric machine 121 is shown coupled to differential 136, and differential 136 is part of rear axle 122.

As shown in FIG. 1, one end of the first half shaft 133a may couple to the differential 186 and the other end of the first half shaft 133a may couple to a first Universal joint 182. As such, the first half shaft 133a may act as the input shaft for the first Universal joint 182. The first universal joint 182 may be coupled to the first front wheel 130a via a first output shaft 188. In this way, the front axle 133 may drive the first front wheel 130a via the first half shaft 133a, the first universal joint 182, and the first output shaft 188. Similarly, one end of the second half shaft 133b may couple to the differential 186 and the other end of the second half shaft 133b may couple to a second universal joint 184. As such, the second half shaft 133b may act as the input shaft for the second universal joint 184. The second universal joint 184 may be coupled to the second front wheel 130b via a second output shaft 190. In this way, the front axle 133 may drive the second front wheel 130b via the second half shaft 133b, the second universal joint 184, and the second output shaft 190.

First electric machine 120 and second electric machine 121 may each receive electrical power from electric energy storage device 132. Furthermore, first electric machine 120 (and/or second electric machine 121) may provide a generator function to convert the vehicle's kinetic energy into electrical energy, where the electrical energy may be stored at electric energy storage device 132 for later use by the first electric machine 120 and the second electric machine 121. An inverter 134 may convert alternating current generated by first electric machine 120 to direct current for storage at the electric energy storage device 132 and vice versa. Electric energy storage device 132 may be a battery, capacitor, inductor, or other electric energy storage device. In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc. Electric energy storage device 132 may receive electric power via a charger 137. Charger 137 may receive electric power via stationary power grid 143 by way of plug 143a and receptacle 144.

Control system 14 may communicate with one or more of electric energy storage device 132, first electric machine 120, second electric machine 121, brake controller 141, inverter 134, steering wheel sensor 175, etc. Control system 14 may receive sensory feedback information from one or more of electric energy storage device 132, first electric machine 120, second electric machine 121, brake controller 141, inverter 134, steering wheel sensor 175, etc. Further, control system 14 may send control signals to one or more of electric energy storage device 132, brake controller 141, inverter 134, first electric machine 120, second electric machine 121, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a driver demand pedal. Similarly, control system 14 may receive an indication of an operator requested vehicle braking via a human operator 102, or an autonomous controller. For example, control system 14 may receive sensory feedback from pedal position sensor 157 which communicates with brake pedal 156. Similarly, control system 14 may receive sensory feedback from steering wheel sensor 175 which communicates with steering wheel 176. For example, steering wheel sensor 175 may be positioned to detect an angular/rotational position of the steering wheel 176.

One or more wheel speed sensors 195 may be coupled to one or more wheels of the electric vehicle propulsion system 100. The wheel speed sensors 195 may detect rotational speed of each wheel. The one or more wheel speed sensors may include a permanent magnet type of sensors or other suitable sensors.

The electric vehicle propulsion system 100 may further include a brake system control module (BSCM) including the brake controller 141. In some examples, the BSCM may comprise an anti-lock braking system, such that wheels (e.g. front wheels 130, first rear wheel 131a, second rear wheel 131b) may maintain tractive contact with the road surface according to driver inputs while braking, which may thus prevent the wheels from locking up, to prevent skidding. In some examples, the BSCM may receive input from the wheel speed sensors 195. Further, the BSCM may communicate with controller 12. The BSCM may apply right friction brakes 196a and left friction brakes 196b to apply torque to rotors (not shown) that are coupled to first half shaft 133a and second half shaft 133b to slow first front wheel 130a and second front wheel 130b.

Control system 14 may include a controller 12. Controller 12 is shown receiving information from a plurality of sensors 16 (various examples of which are described herein) and sending control signals to a plurality of actuators 81 (various examples of which are described herein). As one example, sensors 16 may include the wheel speed sensors 195, wheel position sensors, vehicle yaw rate sensors, vehicle longitudinal acceleration sensors, vehicle lateral acceleration sensors, the steering wheel sensor 175, an accelerator pedal position sensor, a brake pedal position sensor, etc. In some examples, sensors associated with inverter 134, first electric machine 120, second electric machine 121, etc., may communicate information to controller 12. As one example, actuators 81 may include the first electric machine 120, the second electric machine 121, the right friction brakes 196a, the left friction brakes 196b, the transmission 185, etc.

Dashboard 19 may include a human machine interface 18 (HMI) configured to display information to the vehicle operator. HMI 18 may comprise, as a non-limiting example, a touchscreen or display which enables the vehicle operator to view graphical information as well as input commands. In some examples, HMI 18 may be connected wirelessly to the internet (not shown) via controller (e.g. controller 12). As such, in some examples, the vehicle operator may communicate via HMI 18 with an internet site or software application (app).

Dashboard 19 may also include a navigation system 13 that may determine a position of vehicle 101 according to data provided via a satellite network 114 and/or a cellular network 116. Navigation system 13 may also receive input from vehicle occupants. Navigation system 13 may determine a travel route between the vehicle's origin or the vehicle's present position and a destination. Navigation system 13 may also determine a distance from the vehicle's present position to the destination. Navigation system 13 may alone or in combination with control system 14 and/or HMI 18 determine driving patterns. The driving patterns may include routes and parking times for home, stores, offices, filling stations, etc. that are frequent destinations for the vehicle.

Navigation system 13 may also receive weather forecasts for times and days in the future so that navigation system and/or controller 12 may determine a future temperature at the vehicle's destination or parking location. For example, navigation system 13 may request a weather forecast data from a remote server via satellite network 114 or cellular network 116. The weather data may then be used as the ambient environmental temperature at the time the vehicle parks and at the time that the vehicle is expected to exit park.

Dashboard 19 may further include an operator interface 15 via which the vehicle operator may adjust the operating status of the vehicle. Specifically, the operator interface 15 may be configured to initiate and/or terminate operation of the vehicle driveline (e.g., inverter 134 and first electric machine 120) based on an operator input.

The system of FIG. 1 shows controller 12 and brake controller 141, but the methods and systems described herein are not limited to one configuration. Rather, the system may include a single controller or it may distribute control via additional controllers. For example, the system may include a separate controllers configured in hardware and in the form of a vehicle controller, inverter 134, an electric machine controller, a braking system controller, and a vehicle stability controller. Alternatively, the system may include a single controller configured in hardware for performing the method described herein. Thus, the system described herein should not be construed as limiting.

FIG. 2 shows a method 200 for adjusting the torque provided to a motor (e.g., an electric motor) of a vehicle, such as first electric machine 120 of vehicle 101 of FIG. 1. Instructions for carrying out method 200 and the rest of the methods included herein may be executed by a controller of the vehicle, such as controller 12 of FIG. 1, based on instructions stored on a memory of the controller and in conjunction with signals received from sensors of the vehicle, such as the sensors described above with reference to FIG. 1 (e.g., wheel speed sensor 195).

At 202, method 200 may obtain the rotational position and rotational speed of each front wheel of the vehicle. In examples, the rotational position and speed of each wheel may be provided by a traction control system or anti-lock brake system, such as the brake controller 141 of FIG. 1, which may receive output from the wheel speed sensors. The position of each wheel may be obtained based on output from the wheel speed sensors. In some examples, the positon may be provided to the controller as a value of tooth count per road wheel revolution. Each front wheel may have 96 teeth per wheel rotation, 255 teeth per wheel rotation, or some other suitable number of teeth per wheel rotation. Method 200 may include converting the position of each wheel from tooth count to radians. In some examples, the rotational position of each front wheel may not be an absolute position, but instead may be a relative position. For example, the wheel position may always be set to 0 on start-up regardless of the wheel position at start-up. As such, to determine the absolute position of each front wheel, an offset of each wheel position may be entered upon start-up of the vehicle either manually or via a learning function for each wheel position. In other examples, the absolute position of each wheel may be obtained via a missing tooth tone wheel and a keyed connection between the axle shaft and the wheel hub. Alternatively, an additional position sensor (for each wheel) may be added directly to the axle shaft.

The speed of each wheel may be obtained based on output from the wheel speed sensors as a value of rotations per minute (RPM). Method 200 may include converting the speed of each wheel from RPM to radians per second. In some examples, the speed of each wheel may be measured by sensors, such as the wheel speed sensor 195 of FIG. 1. The sensors may be a permanent magnet type of sensor or other type of suitable sensor.

At 204, method 200 may obtain an angle of a steering wheel of the vehicle, such as the steering wheel 176 of vehicle 101 of FIG. 1. The angle of the steering wheel may be obtained as a value of degrees from a steering wheel sensor, such as the steering wheel sensor 175 of FIG. 1. Method 200 may include converting the angle of the steering wheel from degrees to radians using a steering gear ratio. In some examples, the steering gear ratio may be 15.6. In other examples, the steering gear ratio may be another suitable number.

When an input shaft (e.g., the first half shaft 133a of FIG. 1) of a universal joint (e.g., the first universal joint 182 of FIG. 1) is at a different angle than an output shaft (e.g., the first output shaft 188 of FIG. 1) of the same universal joint (e.g., when the universal joint is bent), the rotational speed of the input shaft of the universal joint may not match the rotational speed of the output shaft of the universal joint. As such, the motion of one or more bent universal joints may cause the axle (e.g., the front axle 133 of FIG. 1) of the vehicle to accelerate. In turn, vibrations and/or shuddering may occur due to the acceleration of the axle relative to the inertia of the motor (e.g., first electric machine 120 of FIG. 1).

At 206, method 200 may calculate a respective ratio of speed across each universal joint corresponding to each front wheel. For each front wheel, the ratio of the speed across the universal joint may be calculated from the angle of a steering wheel, such as the steering wheel 176 of FIG. 1, and the rotational position of a front wheel. The sine of the steering wheel angle and the cosine of the front wheel position may both be squared, and the two values may be multiplied together. The product may be subtracted from the value of 1, and the cosine of the steering wheel angle may then be divided by the remaining value.

The ratio of the speed may be calculated for each front wheel/universal joint as a ratio between a speed of a respective universal joint input shaft and a speed of a corresponding universal joint output shaft. For example, for the first universal joint 182, a ratio may be calculated between a speed of the input shaft of the first universal joint 182 (e.g., first half shaft 133a) and the output shaft of the first universal joint 182 (e.g., first output shaft 188). The input shaft of each universal joint may be one half shaft of the front axle of a vehicle, while the output shaft of each universal joint may be a shaft that couples the universal joint to a corresponding front wheel. In this way, method 200 may calculate the ratio of speed between each half shaft of the front axle of a vehicle and the corresponding front wheel. The ratio of speed between the input shaft and output shaft of each universal joint may increase as the angle of the universal joint increases.

At 208, method 200 may calculate a simulated speed of a differential of the vehicle. The ratio of speed between an input shaft and an output shaft of each universal joint may be multiplied by the rotational speed of the front wheel (e.g., the speed of the output shaft) corresponding to (e.g., coupled to) the universal joint to calculate the speed of the corresponding half shaft of the front axle (e.g., the speed of the input shaft). The speed of the first half shaft of the front axle (e.g., the first half shaft 133a of the front axle 133 of FIG. 1) may be added to the speed of the second half shaft of the front axle (e.g., the second half shaft 133b of FIG. 1) to calculate a simulated speed of the differential (e.g., differential 186 of FIG. 1) of the vehicle.

At 210, method 200 may include calculating the acceleration of the front axle using the simulated differential speed. In some examples, the simulated differential speed may be input into a derivative function to calculate a simulated differential acceleration, and therefore an acceleration of the front axle. The acceleration of the front axle over time may be calculated using (e.g., output by) the derivative function. In other examples, the acceleration of the front axle may be calculated by dividing the change in simulated speed of the differential by the change in time for a suitable length of time. Alternatively, the acceleration of the front axle may be provided by a lookup table (e.g., position×angle), saving the mathematical computation.

At 212, method 200 may obtain a gear state of a transmission of the vehicle and determine a gain. The gear state may be selected from a plurality of possible gear states, such as initializing, first gear, second gear, park, shutdown, upshifting, downshifting, or another suitable gear state. The gain may be based on the motor inertia in kilograms times meters squared (kg*m$^2$), and, in some examples, also based on the gear state.

At 214, method 200 may output a universal joint correction torque to adjust a motor speed of the motor of the vehicle. The value of the gain determined at 212 of method 200, as well as a suitable amount of additional gain, may be multiplied by the acceleration of the front axle to determine the correction torque. The correction torque may be added to the torque command that is sent from the vehicle controller to the motor. As such, the correction torque may cause the speed of motor and drivetrain to match the speed of the front axle. In turn, the vibrations and/or shuddering caused by the speed of the front axle not matching the speed of the motor may be reduced.

Figure 3A:
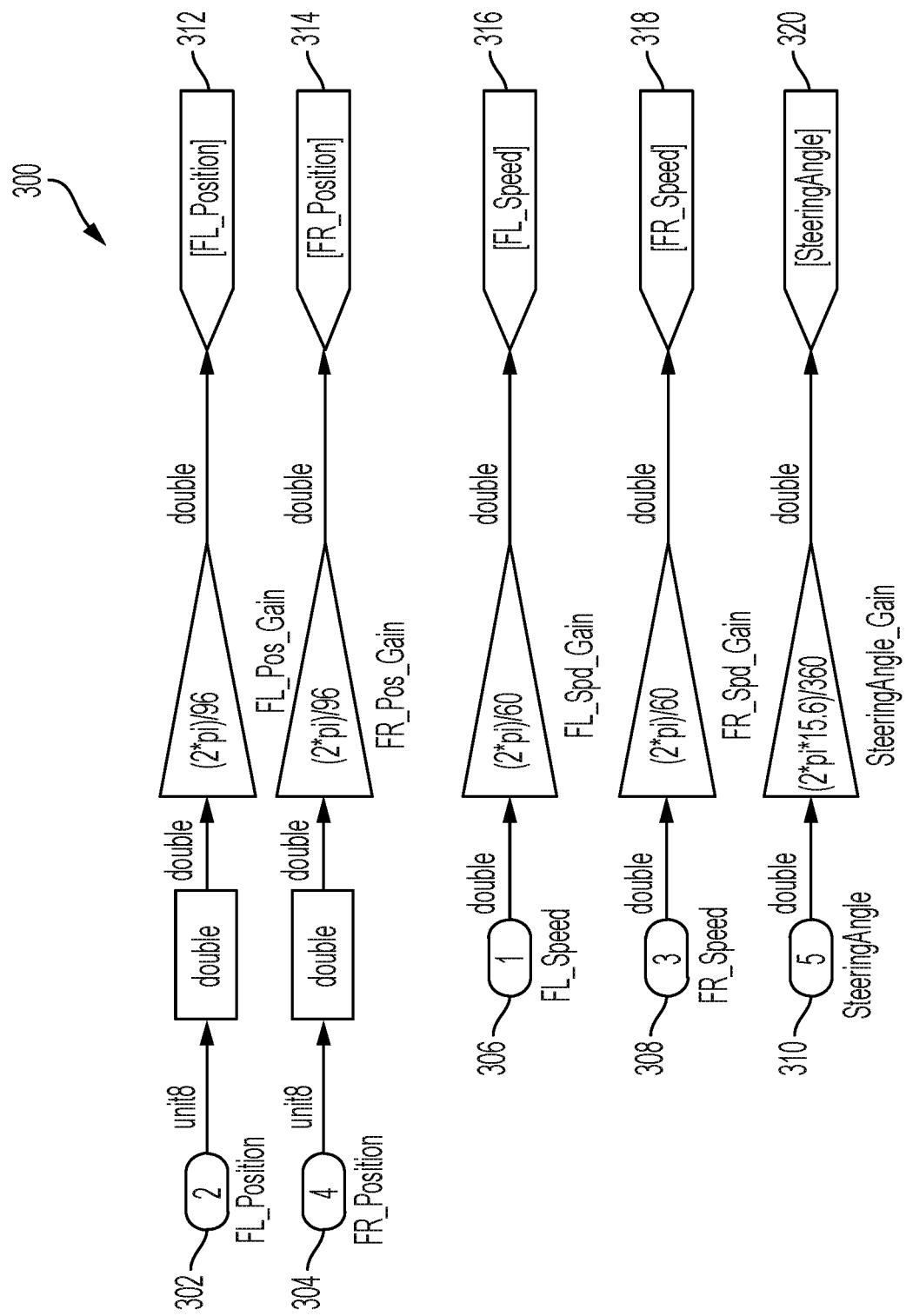
FIGS. 3A-3C are a first control diagram illustrating a first example process for adjusting motor torque based on speed differentials across two universal joints.
Figure 3B:
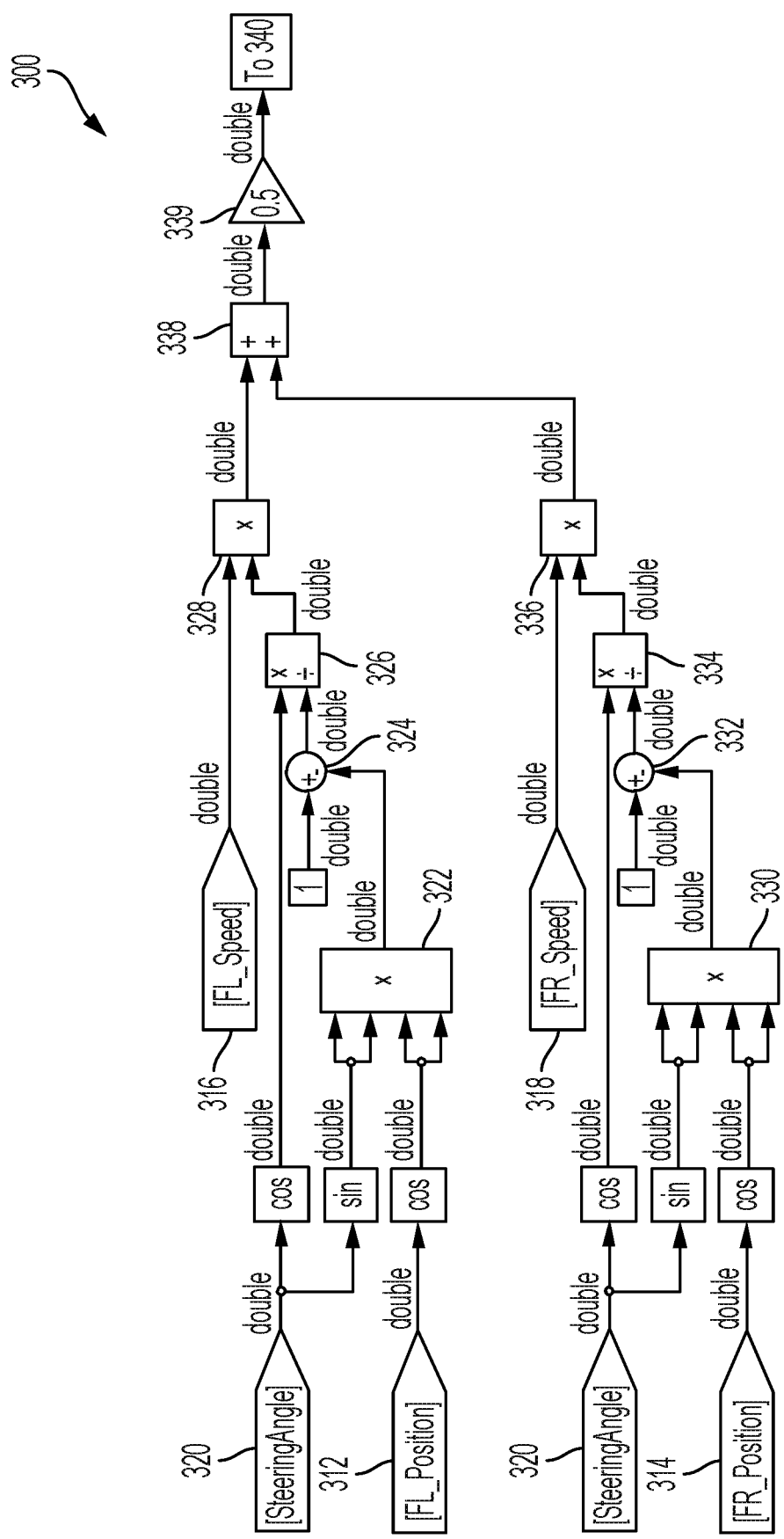
Figure 3C:
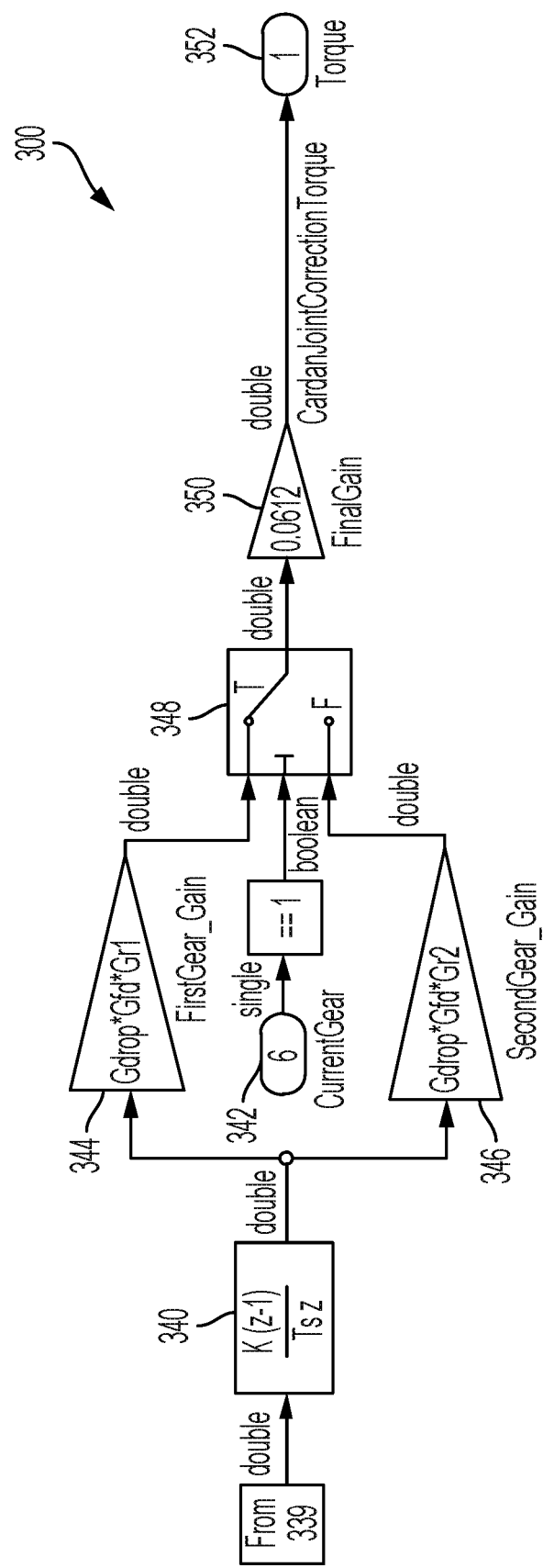

FIGS. 3A-C show a first control diagram 300 for a first example process for adjusting the speed of a motor in a vehicle, such as vehicle 101 of FIG. 1, according to method 200, as described above. The process illustrated by control diagram 300 may be executed by a controller of the vehicle, such as controller 12 of FIG. 1, and may be executed in order to carry out method 200, for example. Control diagram 300 (as well as control diagram 400 of FIG. 4, explained below) may utilize z-transform notation in the discrete time domain. The process illustrated by control diagram 300 may control the amount of torque that is input to the motor, and in turn may adjust the speed of the motor. In this way, the speed of the motor may match the speed of one or more wheels of the vehicle, such as the first front wheel 130a of FIG. 1. In particular, FIG. 3A shows processing of input signals where the signals are processed at various blocks of control diagram 300. The inputs shown in control diagram 300 may include a front left wheel position 302, a front right wheel position 304, a front left wheel speed 306, a front right wheel speed 308, and a steering wheel angle 310, and a correction torque 352 (shown in FIG. 3C) may be output based on the inputs to adjust the speed of a motor (e.g., first electric machine 120 of FIG. 1).

Referring now to FIG. 3A, the front left wheel position 302 and the front right wheel position 304 may each be obtained via output from respective wheel speed sensors or respective position sensors added directly to the axle shaft. As explained previously, to obtain an absolute position for each wheel rather than a relative position, the output from the wheel speed sensors may be adjusted via manual entry or a learning function. In other examples, the wheel speed sensors may include a missing tooth tone wheel and a keyed connection between the axle shaft and the wheel hub, and thus may output an absolute position for each wheel. Each of the front left wheel position 302 and the front right wheel position 304 may be obtained as a value of tooth number and represented as double variables (e.g., double-precision floating-point variables). The front left wheel position 302 and the front right wheel position 304 may be converted to radians and stored as a front left wheel position 312 and a front right wheel position 314, respectively.

The front left wheel speed 306 and the front right wheel speed 308 may each be obtained via sensors, such as the wheel speed sensor 195 of FIG. 1. Each of the front left wheel speed 306 and the front right wheel speed 308 may be obtained as a value of rotations per minute (RPM) and represented as double variables. The front left wheel speed 306 and the front right wheel speed 308 may be converted to radians per second and output as a front left wheel speed 316 and a front right wheel speed 318, respectively.

The steering wheel angle 310 may be obtained via a sensor in a vehicle, such as the steering wheel sensor 175 in the vehicle 101 of FIG. 1. The steering wheel angle 310 may be obtained as a value of degrees and represented as a double variable. The steering wheel angle 310 may be converted to radians and output as a steering wheel angle 320.

Looking now at FIG. 3B, each of the front left wheel position 312, the front right wheel position 314, the front left wheel speed 316, the front right wheel speed 318, and the steering wheel angle 320 may undergo further processing. Control diagram 300 illustrates that the process may calculate the sine and the cosine of the steering wheel angle 320, as well as the cosine of the front left wheel position 312. The sine of the steering wheel angle 320 may be squared, the cosine of the front left wheel position 312 may be squared, and the two values may be multiplied together at block 322. The output of block 322 may be subtracted from the value of 1 at block 324. The cosine of the steering wheel angle 320 may then be divided by the output of block 324 at block 326. The output of block 326 may be the ratio of speed for the input shaft and the output shaft of the universal joint corresponding to the front left wheel (e.g., the second universal joint 184 and the second front wheel 130b of FIG. 1). The output of block 326 may be multiplied by the front left wheel speed 316 at block 328, with the output of block 328 corresponding to the speed of the half shaft of the front axle (e.g., the second half shaft 133b of FIG. 1) that is connected to the universal joint corresponding to the front left wheel.

Similarly, control diagram 300 may calculate the sine and the cosine of the steering wheel angle 320 again, as well as the cosine of the front right wheel position 314. The sine of the steering wheel angle 320 may be squared, the cosine of the front right wheel position 314 may be squared, and the two values may be multiplied together at block 330. The output of block 330 may be subtracted from the value 1 at block 332. The cosine of the steering wheel angle 320 may then be divided by the output of block 332 at block 334. The output of block 334 may be the ratio of speed for the input shaft and the output shaft of the universal joint corresponding to the front right wheel (e.g., the first universal joint 182 and the first front wheel 130a of FIG. 1). The output of block 334 may be multiplied by the front right wheel speed 318 at block 336, with the output of block 336 corresponding to the speed of the half shaft of the front axle (e.g., the first half shaft 133a of FIG. 1) that is connected to the universal joint corresponding to the front right wheel.

The output of block 328 may be added to the output of block 336 at block 338, where the output of block 338 corresponds to the simulated speed of the front axle differential (e.g., differential 186 of FIG. 1). The output of block 338 may be divided in half at block 339 and input into a derivative function at block 340.

Looking now at FIG. 3C, block 340 may calculate the acceleration of the front axle (e.g., front axle 133 of FIG. 1) based on the speed of the differential calculated at block 338 and block 339 of FIG. 3B. Block 340 utilizes z-transform notation in the discrete time domain. The output of block 340 may be multiplied by one or more suitable variables at block 344 in order to calculate an amount of gain when the vehicle is in first gear. Similarly, the output of block 340 may be multiplied by one or more suitable variables at block 346, where at least one of the variables may be different than the variables used in block 344, in order to calculate an amount of gain when the vehicle is in second gear.

A current gear state 342 (e.g., current state of the transmission) may be obtained, and may be represented as a single variable (e.g., a single-precision floating-point variable). The current gear state 342 may be initializing, first gear, second gear, park, shutdown, upshifting, downshifting, or another suitable gear state. At block 348, the process illustrated by control diagram 300 may determine if the vehicle is currently operating in first gear. If the current gear state 342 is equal to the value 1 (e.g., if the vehicle is currently operating in first gear), then the output of block 344 is passed through block 348. Similarly, if the current gear state 342 is not equal to the value 1 (e.g., if the vehicle is currently not operating in first gear), then the output of block 346 is passed through block 348. The value that is passed through block 348 is then multiplied by the final gain at block 350, which may represent the motor inertia. The motor gain may be determined empirically. In some examples, the final gain may have a value of 0.0612. The output of block 350 is the correction torque 352, which is output and added to the torque command from a vehicle controller to the motor. As such, the correction torque 352 may adjust the speed of the motor (e.g., first electric machine 120 of FIG. 1) to match the speed of the front axle (e.g., front axle 133 of FIG. 1).

Figure 4A:
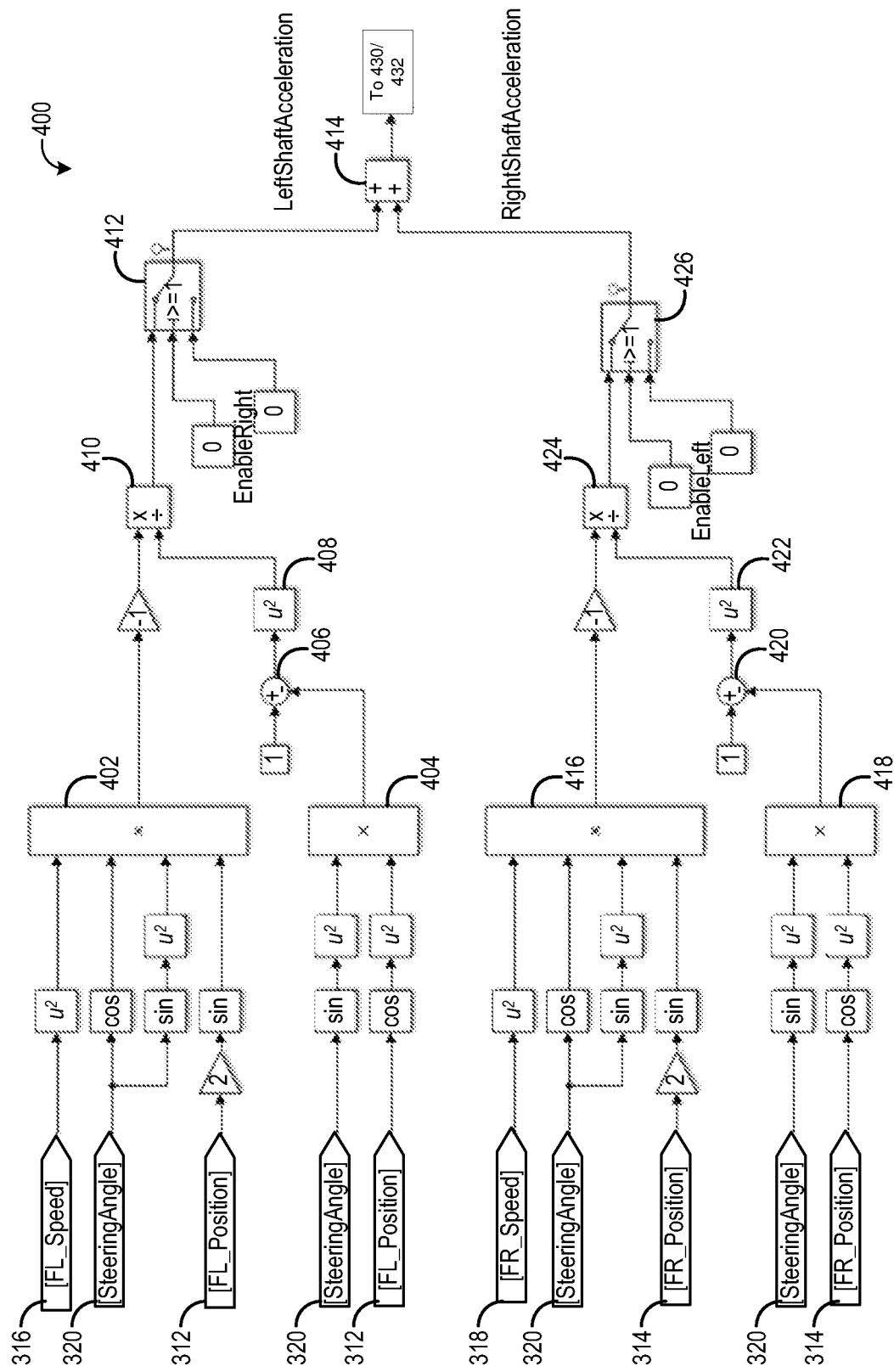
FIGS. 4A and 4B are a second control diagram illustrating a second example process for adjusting motor torque based on speed differentials across two universal joints.
Figure 4B:
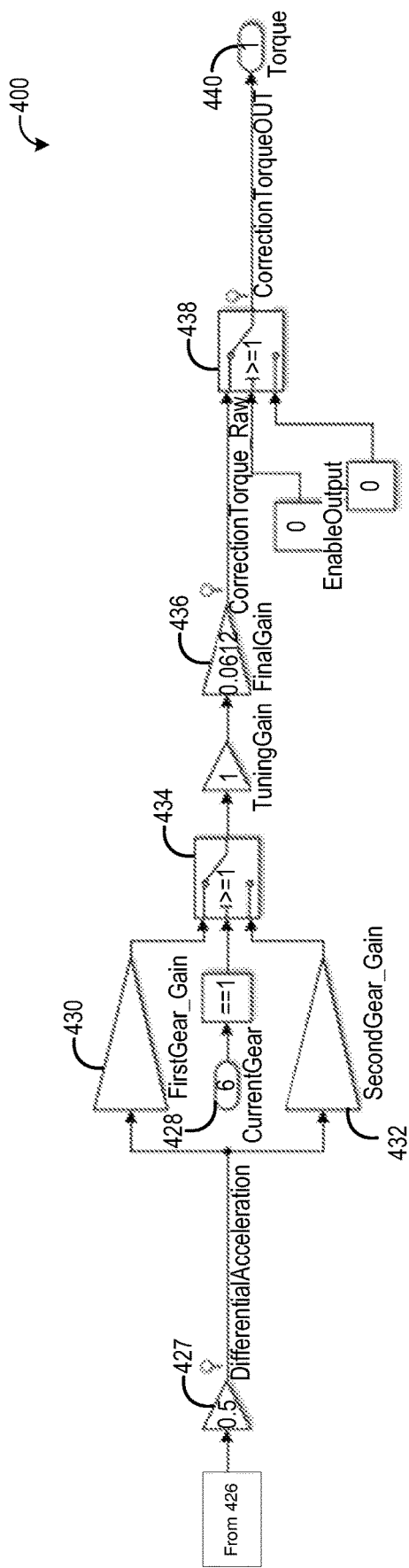

FIGS. 4A and 4B, along with FIG. 3A show a second control diagram 400 for a second example process for adjusting the speed of a motor in a vehicle, such as vehicle 101 of FIG. 1, according to method 200, as described above. The process illustrated by control diagram 400 may operate within a controller of the vehicle, such as controller 12 of FIG. 1. Control diagram 400 may be executed by a controller of the vehicle, such as controller 12 of FIG. 1, and may be executed in order to carry out method 200, for example. The process illustrated by control diagram 400 may control the amount of torque that is input to the motor, and in turn may adjust the speed of the motor. In this way, the speed of the motor may match the speed of one or more wheels of the vehicle, such as the first front wheel 130a of FIG. 1. In particular, the inputs for the process illustrated by control diagram 400 may be the same inputs that are processed in the same manner as the inputs of the process illustrated in FIG. 3A, and thus are not shown in FIGS. 4A and 4B. Thus, the process illustrated by control diagram 400 may take as input the front left wheel position 302, the front right wheel position 304, the front left wheel speed 306, the front right wheel speed 308, and the steering wheel angle 310, similar to the control diagram 300. A correction torque 440 (shown in FIG. 4B) may be output based on the inputs to adjust the speed of a motor (e.g., first electric machine 120 of FIG. 1).

As shown in FIG. 3A, as the inputs may include the front left wheel position 302, the front right wheel position 304, the front left wheel speed 306, the front right wheel speed 308, and the steering wheel angle 310 and process each input into the front left wheel position 312, the front right wheel position 314, the front left wheel speed 316, the front right wheel speed 318, and the steering wheel angle 320, respectively.

Looking now at FIG. 4A, each of the front left wheel position 312, the front right wheel position 314, the front left wheel speed 316, the front right wheel speed 318, and the steering wheel angle 320 may undergo further processing. The further processing may include squaring the front left wheel speed, calculating the cosine of the steering wheel angle 320, calculating the sine of the steering wheel angle 320 and squaring it, and calculating the sine of 2 multiplied by the front left wheel position 312, before multiplying the four values together at block 402. Additionally, the process illustrated by control diagram 400 may square the sine of the steering wheel angle 320 and multiply the value by the square of the cosine of the front left wheel position 312 at block 404. The output of block 404 may be subtracted from the value of 1 at block 406. Further, the output of block 406 may be squared at block 408. At block 410, the negative of the output of block 402 may be divided by the output of block 408. Control diagram 400 shows that the process may decide at block 412 if the output of block 410 is passed to block 414, or if a value of 0 is passed to block 414. The output of block 410 may correspond to the acceleration of one half shaft (e.g., the second half shaft 133b of FIG. 1) of the front axle (e.g., the front axle 133 of FIG. 1) of the vehicle.

Similarly, the front right wheel speed 318 may be squared, the cosine of the steering wheel angle 320 may be calculated, the sine of the steering wheel angle 320 may be calculated and squared, and the sine of 2 multiplied by the front right wheel position 314 may be calculated, before multiplying the four values together at block 416. Additionally, the process of control diagram 400 may square the sine of the steering wheel angle 320 and multiply the value by the square of the cosine of the front right wheel position 314 at block 418. The output of block 418 may be subtracted from the value of 1 at block 420. Further, the output of block 420 may be squared at block 422. At block 424, the negative of the output of block 416 may be divided by the output of block 422. Control diagram 400 shows that the process may decide at block 426 if the output of block 424 is passed to block 414, or if a value of 0 is passed to block 414. The output of block 424 may correspond to the acceleration of one half shaft (e.g., the first half shaft 133a of FIG. 1) of the front axle (e.g., the front axle 133 of FIG. 1) of the vehicle.

At block 414, the values that are output from block 412 and block 426 are added together. The output of block 414 may correspond to the simulated acceleration of the differential (e.g., differential 186 of FIG. 1).

Looking now at FIG. 4B, the output of block 414 may be multiplied by a value of 0.5 at block 427 before being multiplied by one or more suitable variables at block 430 in order to calculate an amount of gain when the vehicle is in first gear. Similarly, the output of block 414 may be multiplied by a value of 0.5 at block 427 before being multiplied by one or more suitable variables at block 432, where at least one of the variables may be different than the variables used in block 430, in order to calculate an amount of gain when the vehicle is in second gear.

A current gear state 428 may be obtained (e.g., based on the current state of the transmission). The current gear state 428 may be initializing, first gear, second gear, park, shutdown, upshifting, downshifting, or another suitable gear state. At block 434, the process of control diagram 400 may determine if the vehicle is currently operating in first gear. If the current gear state 428 is equal to the value 1 (e.g., if the vehicle is currently operating in first gear), then the output of block 430 is passed through block 434. Similarly, if the current gear state 428 is not equal to the value 1 (e.g., if the vehicle is currently not operating in first gear), then the output of block 432 is passed through block 434. The value that is passed through block 434 is then multiplied by a tuning gain before being multiplied by a final gain at block 436. In some examples, the tuning gain may have a value of 1. In some examples, the final gain may have a value of 0.0612.

At block 438, the process may determine if the output of block 436 is output as a correction torque 440 or if no correction torque is output. A compensation/correction torque may be most effective during low speed, high steering angle maneuvers, and it may be desirable to filter out the compensation torque at higher speeds. As such, in some examples, the output of block 436 may be filtered out and a value of 0 may be output as the correction torque 440 when the correction torque value is below a threshold value (e.g., a value of one). The output of block 438 is the correction torque 440, which is output and added to the torque command from vehicle controller to the motor. As such, the correction torque 440 may adjust the speed of the motor (e.g., first electric machine 120 of FIG. 1) to match the speed of the front axle (e.g., front axle 133 of FIG. 1). In examples where the correction torque is less than the threshold value (e.g., less than one) and thus is filtered out (e.g., set to zero), the speed of the motor may be adjusted/based only on the torque command determined by the controller. In examples, the torque command may be determined by the controller based on accelerator pedal position, e.g., to propel the vehicle at a speed commanded by an operator.

Figure 5:
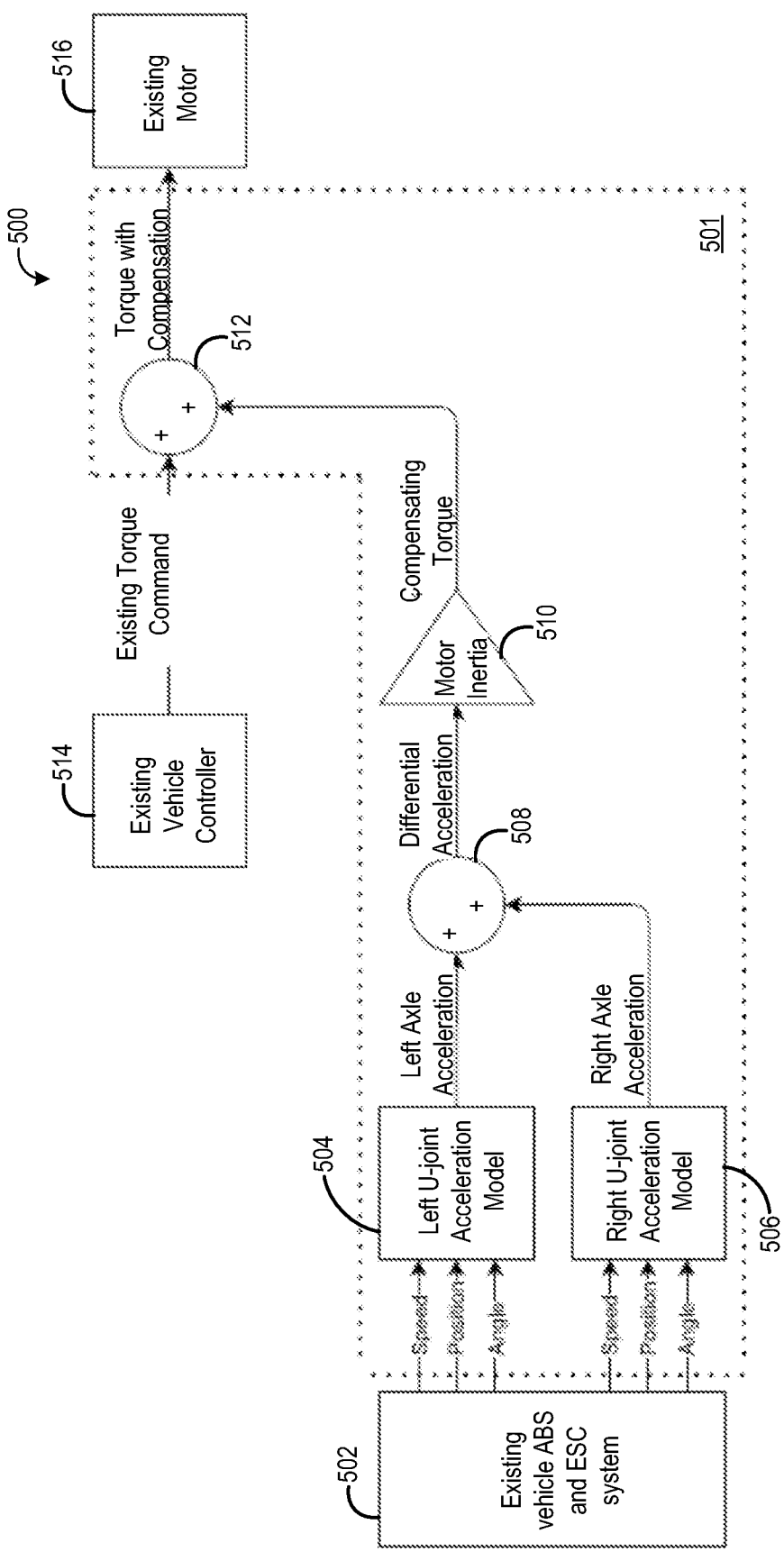
FIG. 5 is a third control diagram illustrating a third example process for adjusting motor torque based on speed differentials across two universal joints.

FIG. 5 shows a third control diagram 501 for a third example process for adjusting the speed of a motor in a vehicle, such as vehicle 101 of FIG. 1, according to method 200, as described above. The process illustrated by control diagram 501 may be executed by a controller of the vehicle, such as controller 12 of FIG. 1, and may be executed in order to carry out method 200, for example. The process illustrated by control diagram 501 may control the amount of torque that is input to the motor, and in turn may adjust the speed of the motor. In this way, the speed of the motor may match the speed of one or more wheels of the vehicle (e.g., a first wheel and a second wheel), such as the first front wheel 130*a* and the second front wheel 130*b* of FIG. 1. The process of control diagram 501 may take as input the position and speed of a front left wheel and the angle of a corresponding left universal joint (e.g., the second front wheel 130*b* and the second universal joint 184 of FIG. 1). Additionally, the process of control diagram 501 may take as input the position and speed of a front right wheel and the angle of a corresponding right universal joint (e.g., the first front wheel 130*a* and the first universal joint 182 of FIG. 1). The inputs shown in control diagram 501 may be acquired from an existing vehicle anti-lock brake system (ABS) and/or an existing electronic stability control (ESC) system at block 502 (which may receive output from the various sensors described above, e.g., wheel speed sensors, steering position sensor, etc.).

The position and speed of the front left wheel and the angle of the corresponding left universal joint may be output from block 502 and input into a left U-joint acceleration model at block 504. At block 504, the U-joint acceleration model may calculate the acceleration of a half shaft of the front axle (e.g., the second half shaft 133*b* of front axle 133 of FIG. 1) based on the speed of the left front wheel, the position of the left front wheel, and the angle of the left universal joint (e.g., U-joint)/steering angle. Similarly, the position and speed of the front right wheel and the angle of the corresponding right universal joint may be output from block 502 and input into a right U-joint acceleration model at block 506. At block 506, the right U-joint acceleration model may calculate the acceleration of the other half shaft of the front axle (e.g., the first half shaft 133*a* of front axle 133 of FIG. 1) based on the speed of the right front wheel, the position of the right front wheel, and the angle of the right universal joint (e.g., U-joint)/steering angle.

At block 508, the acceleration of the left axle (e.g., first shaft) that is output by block 504 may be added to the acceleration of the right axle (e.g., second shaft) that is output by block 506. The output of block 508 may correspond to the acceleration of a differential (e.g., differential 186 of FIG. 1) which is equal to the sum of the left axle acceleration (e.g., first shaft acceleration) and the right axle acceleration (e.g., second shaft acceleration. The output of block 508 may be multiplied by the inertia of the motor at block 510 resulting in an amount of compensating torque. The compensating torque that is output by block 510 may be added to an existing torque command that is output at block 514 by the vehicle controller. The existing torque command that is output at block 514 may be based at least in part on the position of an accelerator pedal (e.g., driver demand pedal), such as the pedal 192 of vehicle 101 of FIG. 1. The compensating torque may be added to the existing torque at block 512. Block 512 may output a torque command including the compensating torque, which is input to an existing motor (e.g., first electric machine 120 of FIG. 1) at block 516. The torque that is input to the existing motor at block 516 may adjust the speed of the motor such that the speed of the motor matches the speed of the front axle.

Figure 6:
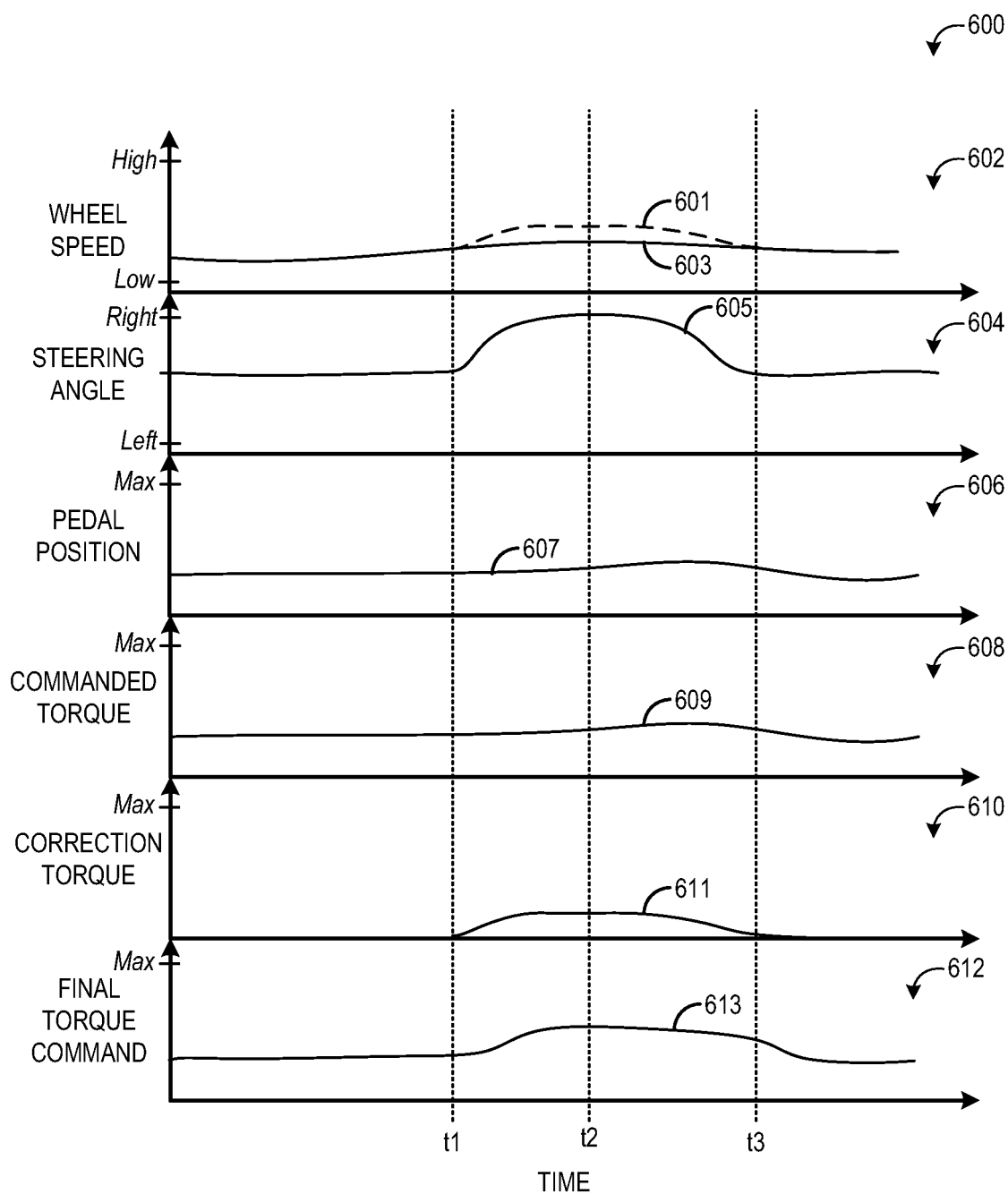
FIG. 6 is a timing diagram illustrating an example sequence of actions/events that may occur during execution of the method of FIG. 2.

Referring now to FIG. 6, a timing diagram 600 shows an exemplary timing of a sequence of events that may occur during execution of method 200, as a vehicle travels along a route. A horizontal (x-axis) of timing diagram 600 denotes time, and vertical markers t1-t3 identify significant times at which the events occur. Timing diagram 600 includes six plots. A first plot 602 shows wheel speed over time for both a left front wheel (shown by line 601) and a right front wheel (shown by line 603) of the vehicle. The wheel speed may start at zero and increase to a maximum possible speed, with markers on the vertical axis indicating a range of relatively low speed and relatively high speed. A second plot 604 shows steering angle over time (e.g., the position of a steering wheel of the vehicle), with the steering angle being zero in the middle of the vertical axis and angled toward the right (increasing from the zero angle) or toward the left (decreasing from the zero angle). A third plot 606 shows pedal position over time for an accelerator pedal of the vehicle, wherein the maximum pedal position is fully depressed and a minimum pedal position is not depressed. A fourth plot 608 shows commanded torque over time, wherein the commanded torque is the torque determined by the controller of the vehicle in order to propel the vehicle at a speed requested by an operator of the vehicle (e.g., based on the pedal position). The commanded torque may start at zero and increase to a maximum possible torque. A fifth plot 610 shows a correction torque (over time) calculated as described herein, e.g., based on a simulated differential acceleration (which is in turn based on a speed ratio across each universal joint as determined by the speed and position of each of the left front wheel and right front wheel as well as the steering angle). The correction torque may start at zero and increase to a maximum possible torque. A sixth plot 612 shows a final torque command over time, wherein the final torque command is the torque command sent to the electric motor of the vehicle and is based on the commanded torque and the correction torque. The final torque command may start at zero and increase to a maximum possible torque.

Prior to time t1, the vehicle is being operated on a relatively flat, straight portion of the route. As such, the wheel speed of both the left front wheel and the right front wheel is equal, as shown by line 601 and line 603. The steering wheel is maintained at a constant, straight angle (e.g., the steering wheel is not angled toward the left or the right), as shown by line 605 of plot 604. The operator of the vehicle is maintaining the vehicle at a relatively low and constant speed, as shown by line 607 of plot 606. Thus, the commanded torque is also relatively low and constant prior to time t1, as shown by line 609 of plot 608. As the steering angle is at the zero angle, the universal joints are not bent and the speed ratio across each universal joint may be one. Thus, prior to time t1, the correction torque may be zero, as shown by line 611 of plot 610. Accordingly, the final torque command may be equal to the commanded torque, as shown by line 613 of plot 612.

At time t1, the vehicle may begin to enter a portion of the route that includes a curve and thus the operator may move the steering wheel toward the right to navigate the vehicle around the curve, as shown by line 605 increasing to the right. The operator may maintain the same pedal position, shown by line 607 (as the vehicle was already operating at a relatively low speed in anticipation of the upcoming curve). Thus, the wheel speeds may not change as the vehicle navigates the curve other than the wheel speed of the left front wheel may increase slightly relative to the wheel speed of the right front wheel due to the curve, as shown by lines 601 and 603. Because the operator is maintaining the pedal position, the commanded torque stays constant following time t1 and is the same as the commanded torque prior to time t1. However, as the steering angle has changed and thus the universal joints are bent, the speed ratio across each universal joints have deviated from one, thereby causing an increase in acceleration of the front axle, and thus the correction toque is greater than zero following time t1, as shown by line 611. When the correction torque is added to the commanded torque, the final torque command thereby increases relative to the commanded torque, as shown by line 613.

The steering angle reaches a peak at time t2 and then begins to return to zero, reaching the zero angle at time t3. From time t1 to time t3, the correction torque may be above zero, and thus the final torque command may be increased relative to the commanded torque. After time t3, with the steering angle back to the zero angle, the final torque command may again match the commanded torque. It is to be appreciated that between time t1 and t2, when the pedal position remains constant and is equal to the pedal position prior to time t1, the final torque command may increase due to the correction torque, despite the pedal position staying the same and not increasing. Thus, the correction torque may result in the speed of the motor being increased to match the speed of the front axle and reduce any vibrations that would otherwise be caused as the vehicle navigates the curve.

Thus, the speed of a motor may be matched to the speed of an output shaft of a universal joint, maintaining constant wheel speed despite bent universal joints. The position of the universal joint and bend angle may be provided to a controller, along with the rotational position and speed of an axle shaft. In turn, the controller may simulate the universal joint motion and output a torque (e.g., the correction torque) that may be added to a traction torque command (e.g., the commanded torque) from the vehicle. As such, the torque output by the controller (e.g., the final torque command) may adjust the speed of the motor to match the speed of the universal joint and maintain a constant road wheel speed. The controller may compensate for two universal joints connected via a differential.

The disclosure also provides support for a method for operating a vehicle system, comprising: determining a motion of a universal joint in a drive axle assembly of the vehicle system, and adjusting a speed of a motor of the vehicle system based on the motion of the universal joint. In a first example of the method, determining the motion of the universal joint comprises determining the motion of the universal joint based on a speed of an input shaft and a speed of an output shaft of the universal joint. In a second example of the method, optionally including the first example, determining the motion of the universal joint comprises determining the motion of the universal joint based on a steering wheel angle of the vehicle system, a rotational position of a wheel coupled to a drive axle of the drive axle assembly via the universal joint, and a speed of the wheel. In a third example of the method, optionally including one or both of the first and second examples, adjusting the speed of the motor comprises adjusting the speed of the motor based on a correction torque determined based on the motion of the universal joint. In a fourth example of the method, optionally including one or more or each of the first through third examples, determining the correction torque based on the motion of the universal joint comprises calculating a simulated speed of a differential of the drive axle assembly based on the motion of the universal joint, calculating an acceleration of the drive axle assembly based on the simulated speed, and determining the correction torque based on the acceleration of the drive axle assembly. In a fifth example of the method, optionally including one or more or each of the first through fourth examples, the universal joint is a first universal joint, and further comprising determining a motion of a second universal joint in the drive axle assembly and adjusting the speed of the motor based on the motion of the first universal joint and the motion of the second universal joint. In a sixth example of the method, optionally including one or more or each of the first through fifth examples, adjusting the speed of the motor based on the motion of the first universal joint and the motion of the second universal joint comprises calculating the simulated speed of the differential based on the motion of the first universal joint and the motion of the second universal joint.

The disclosure also provides support for a method, comprising: adjusting a speed of an electric motor of a vehicle based on a simulated differential acceleration, the simulated differential acceleration determined based on a first shaft acceleration of a first shaft coupled to a first wheel of the vehicle via a first universal joint and a second shaft acceleration of a second shaft coupled to a second wheel of the vehicle via a second universal joint. In a first example of the method, the method further comprises: calculating the first shaft acceleration of the first shaft based on an angle of a steering wheel of the vehicle, a rotational position of the first wheel, and a rotational speed of the first wheel. In a second example of the method, optionally including the first example, the method further comprises: calculating the second shaft acceleration of the second shaft based on the angle of the steering wheel of the vehicle, a rotational position of the second wheel, and a rotational speed of the second wheel. In a third example of the method, optionally including one or both of the first and second examples, adjusting the speed of the electric motor based on the simulated differential acceleration comprises determining a correction torque based on the simulated differential acceleration and adjusting the speed of the electric motor by adding the correction torque to a commanded torque. In a fourth example of the method, optionally including one or more or each of the first through third examples, determining the correction torque based on the simulated differential acceleration comprises multiplying the simulated differential speed by a gain that is selected based on a current gear state and motor inertia.

The disclosure also provides support for a system, comprising: a front axle comprising a first shaft coupled to a right wheel via a first universal joint and a second shaft coupled to a left wheel via a second universal joint, a differential coupled to the front axle, an electric motor coupled to the differential, and a controller configured to adjust a speed of the electric motor based on a simulated acceleration of the differential, the simulated acceleration of the differential determined based on a first shaft acceleration of the first shaft and a second shaft acceleration of the second shaft. In a first example of the system, the controller is configured to determine a torque command based on a position of an accelerator pedal and adjust the speed of the electric motor based on the torque command and a correction torque determined based on the simulated acceleration of the differential. In a second example of the system, optionally including the first example, the controller is configured to determine the correction torque by multiplying the simulated acceleration of the differential by a gain determined based on a current gear state. In a third example of the system, optionally including one or both of the first and second examples, the controller is configured to adjust the speed of the electric motor based only on the torque command when the correction torque is below a threshold value. In a fourth example of the system, optionally including one or more or each of the first through third examples, the controller is configured to calculate the first shaft acceleration of the first shaft based on an angle of a steering wheel, a rotational position of the first wheel, and a rotational speed of the first wheel. In a fifth example of the system, optionally including one or more or each of the first through fourth examples, the controller is configured to calculate the second shaft acceleration of the second shaft based on the angle of the steering wheel, a rotational position of the second wheel, and a rotational speed of the second wheel.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed four, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle system, comprising:
   determining a motion of a universal joint in a drive axle assembly of the vehicle system; and
   adjusting a speed of a motor of the vehicle system based on the motion of the universal joint.

2. The method of claim 1, wherein determining the motion of the universal joint comprises determining the motion of the universal joint based on a speed of an input shaft and a speed of an output shaft of the universal joint.

3. The method of claim 1, wherein determining the motion of the universal joint comprises determining the motion of the universal joint based on a steering wheel angle of the vehicle system, a rotational position of a wheel coupled to a drive axle of the drive axle assembly via the universal joint, and a speed of the wheel.

4. The method of claim 1, wherein adjusting the speed of the motor comprises adjusting the speed of the motor based on a correction torque determined based on the motion of the universal joint.

5. The method of claim 4, wherein determining the correction torque based on the motion of the universal joint comprises calculating a simulated speed of a differential of the drive axle assembly based on the motion of the universal joint, calculating an acceleration of the drive axle assembly based on the simulated speed, and determining the correction torque based on the acceleration of the drive axle assembly.

6. The method of claim 5, wherein the universal joint is a first universal joint, and further comprising determining a motion of a second universal joint in the drive axle assembly and adjusting the speed of the motor based on the motion of the first universal joint and the motion of the second universal joint.

7. The method of claim 6, wherein adjusting the speed of the motor based on the motion of the first universal joint and the motion of the second universal joint comprises calculating the simulated speed of the differential based on the motion of the first universal joint and the motion of the second universal joint.

8. A method, comprising:
adjusting a speed of an electric motor of a vehicle based on a simulated differential acceleration, the simulated differential acceleration determined based on a first shaft acceleration of a first shaft coupled to a first wheel of the vehicle via a first universal joint and a second shaft acceleration of a second shaft coupled to a second wheel of the vehicle via a second universal joint.

9. The method of claim 8, further comprising calculating the first shaft acceleration of the first shaft based on an angle of a steering wheel of the vehicle, a rotational position of the first wheel, and a rotational speed of the first wheel.

10. The method of claim 9, further comprising calculating the second shaft acceleration of the second shaft based on the angle of the steering wheel of the vehicle, a rotational position of the second wheel, and a rotational speed of the second wheel.

11. The method of claim 8, wherein adjusting the speed of the electric motor based on the simulated differential acceleration comprises determining a correction torque based on the simulated differential acceleration and adjusting the speed of the electric motor by adding the correction torque to a commanded torque.

12. The method of claim 11, wherein determining the correction torque based on the simulated differential acceleration comprises multiplying the simulated differential speed by a gain that is selected based on a current gear state and motor inertia.

13. A system, comprising:
a front axle comprising a first shaft coupled to a right wheel via a first universal joint and a second shaft coupled to a left wheel via a second universal joint;
a differential coupled to the front axle;
an electric motor coupled to the differential; and
a controller configured to adjust a speed of the electric motor based on a simulated acceleration of the differential, the simulated acceleration of the differential determined based on a first shaft acceleration of the first shaft and a second shaft acceleration of the second shaft.

14. The system of claim 13, wherein the controller is configured to determine a torque command based on a position of an accelerator pedal and adjust the speed of the electric motor based on the torque command and a correction torque determined based on the simulated acceleration of the differential.

15. The system of claim 14, wherein the controller is configured to determine the correction torque by multiplying the simulated acceleration of the differential by a gain determined based on a current gear state.

16. The system of claim 15, wherein the controller is configured to adjust the speed of the electric motor based only on the torque command when the correction torque is below a threshold value.

17. The system of claim 13, wherein the controller is configured to calculate the first shaft acceleration of the first shaft based on an angle of a steering wheel, a rotational position of the first wheel, and a rotational speed of the first wheel.

18. The system of claim 13, wherein the controller is configured to calculate the second shaft acceleration of the second shaft based on the angle of the steering wheel, a rotational position of the second wheel, and a rotational speed of the second wheel.

* * * * *